(12) United States Patent
Eggemann et al.

(10) Patent No.: US 9,339,875 B2
(45) Date of Patent: May 17, 2016

(54) DEEP HOLE DRILL COMPRISING A COATING

(75) Inventors: Jens Eggemann, Guldental (DE); Detlev Bross, Neu Wulmstorf (DE); Gerhard Peyerl, Geisenheim (DE); Klaus Springer, Herten (DE)

(73) Assignee: OERLIKON SURFACE SOLUTIONS AG, PFÄFFIKON, Pfäffikon SZ (CH)

( * ) Notice: Subject to any disclaimer, the term of this patent is extended or adjusted under 35 U.S.C. 154(b) by 767 days.

(21) Appl. No.: 13/511,224

(22) PCT Filed: Nov. 19, 2010

(86) PCT No.: PCT/EP2010/007029
§ 371 (c)(1),
(2), (4) Date: Oct. 5, 2012

(87) PCT Pub. No.: WO2011/060947
PCT Pub. Date: May 26, 2011

(65) Prior Publication Data
US 2013/0028676 A1    Jan. 31, 2013

Related U.S. Application Data

(60) Provisional application No. 61/263,449, filed on Nov. 23, 2009.

(51) Int. Cl.
*B23B 51/00* (2006.01)
*B23B 51/04* (2006.01)
*B23P 6/00* (2006.01)

(52) U.S. Cl.
CPC . *B23B 51/04* (2013.01); *B23P 6/00* (2013.01); *B23B 2228/10* (2013.01); *B23B 2251/424* (2013.01); *Y10T 408/78* (2015.01); *Y10T 408/909* (2015.01)

(58) Field of Classification Search
CPC .............. B23B 2251/424; B23B 2224/24; B23B 2224/28; B23B 2224/32; B23B 2224/36; B23B 2228/04; B23B 2228/08; B23B 2228/10; B23B 2228/12; B23B 2228/36
USPC .................. 408/144, 145, 199, 227; 76/108.1
See application file for complete search history.

(56) References Cited

U.S. PATENT DOCUMENTS

| | | | |
|---|---|---|---|
| 6,688,817 B2 * | 2/2004 | Borschert et al. | 408/230 |
| 7,147,413 B2 * | 12/2006 | Henderer et al. | 408/144 |
| 7,753,627 B2 * | 7/2010 | Randecker et al. | 408/199 |
| 2005/0244236 A1 * | 11/2005 | Bosman | 408/59 |
| 2008/0056835 A1 * | 3/2008 | Astrand et al. | 408/144 |
| 2009/0047080 A1 * | 2/2009 | Schweighofer et al. | 408/59 |

FOREIGN PATENT DOCUMENTS

| | | | |
|---|---|---|---|
| JP | 01240215 A * | 9/1989 | |
| JP | 2003275909 A * | 9/2003 | |
| JP | 2005052953 A * | 3/2005 | |
| JP | 2005088149 A * | 4/2005 | |
| JP | 2005-118906 A | 5/2005 | |
| JP | 2006-082206 A | 3/2006 | |
| WO | 2004/087356 A1 | 10/2004 | |
| WO | 2006/084859 A1 | 8/2006 | |
| WO | 2008/030177 A1 | 3/2008 | |

OTHER PUBLICATIONS

International Search Report for PCT/EP2010/007029 dated Feb. 18, 2011.

* cited by examiner

*Primary Examiner* — Daniel Howell
(74) *Attorney, Agent, or Firm* — Pearne & Gordon LLP

(57) ABSTRACT

The invention relates to a deep-hole drill, comprising a first coating extending over the effective length of the guide section and a second coating that is applied to the tip of the drill in the cutting region, the region of which extends over an axial length that, at a maximum, corresponds to double the nominal diameter of the drill. In such a way, when the bore tip is worn by use, said tip can be recoated after sharpening without the nominal diameter of the drill tip substantially increasing, in particular even after being sharpened several times.

10 Claims, No Drawings

DEEP HOLE DRILL COMPRISING A COATING

The present invention relates to a deep-hole drill with straight flutes, wherein at least the tip of the drill and a section around the drill tip are coated.

Coated drills have been known for a long time. In most cases, the coating seeks to increase the drill's wear resistance in particular in the area of the drill tip. Coated drills are in this respect usually twist drills. In connection with twist drills, it is also known among others to coat the cutting region completely, i.e. over the entire spiral-shaped area of the flutes. The aim of such a coating is to achieve a simpler transport of the chippings as well as increase the tip's wear resistance.

Twist drills are known that can be used for drilling very deep holes. In the frame of the present description, however, deep-hole drills mean those drills that are in fact not twist drills but rather have an essentially straight flute for removing the chippings.

A fluid, for example a gas or a liquid serving to cool and to lubricate, is often pumped at high pressure to the drill tip through one or several cooling channels running along the drill shaft and ending at the drill tip, exits from the drill tip and is essentially flushed out of the hole along the tool, with the chippings being evacuated with it. This means it is not seriously possible to achieve an improved transport of the chippings by means of a coating. The known coatings for deep-hole drills have thus restricted themselves so far to the area of the drill tip. For example, WO2004087356 discloses a single-lip drill with a functional coating. The functional coating in this case specifically has the task of preventing wear at the functional surfaces involved in the cutting process.

Deep-drilled holes are usually bored holes with a diameter between approximately 1 mm to 1500 mm and a drilling depth from approximately three times the nominal diameter. In this respect, there is a difference to be made among others between single-lip drills and twin-fluted drills. An essential feature connected with deep-hole drills is that deep-hole drills, unlike twist drills, do not center themselves through a tip that is as central as possible on the front side, but rather align themselves on the cylindrical lateral surfaces of the bored hole.

This, however, means that the area of the deep-hole drill responsible for guiding the drill can play a considerable role. Although this area is not subjected to such extreme loads as those occurring at the drill tip, there will also be wear and tear here, in particular during a longer period of use, which has a negative impact on the drilling behavior.

One solution to the problem consists in also coating the area of the deep-hole drill responsible for guiding the drill with the layer as is provided for the drill tip. In this connection, it has been shown that it is sufficient to extend the coating of the drill tip to an area that clearly exceeds the nominal diameter and that corresponds for example to approximately eight times the nominal diameter.

The problem then arises that due to the increased wear in the main functional area, the anti-wear layer erodes very much faster there than in the drill guide area. Thus, whilst in the main functional area the anti-wear layer can have already been strongly attacked, it is probable that the anti-wear layer in the guide area is still completely intact. If a second coating is then applied, it is applied over the still completely intact layer in the guide area. This results in an increase of the bore diameter in this area, which after several cycles can lie in the region of one or several tenths. In order to avoid this, before the anti-wear layer is applied again, the deep-hole drill can be completely stripped of its coating. Coat-removing methods for removing anti-wear layers are however laborious and often affect the substrate itself. This means that the guide area, although it is no longer affected by the drilling process itself, can become brittle following multiple coat removals because of the aggressive methods used.

There is thus a need for a deep-hole drill that can be recycled after use in an easy manner, wherein in addition to constantly good drilling properties, it is possible to maintain a stable drill guide and a stable cutting edge.

The corresponding aim constitutes the basis for the present invention.

The aim is achieved according to the invention by means of a deep-hole drill having the characteristics of claim 1.

The inventive deep-hole drill is characterized in that it has a first coating extending from the drill tip over an area over which the cutting edge is effective in relation to guiding the drill tip and in that a second coating, different from the first coating, is provided only in a small area in the vicinity of the drill tip.

Preferably, the first coating extends over an area corresponding approximately to eight times the nominal diameter of the drill. After the first layer has been applied, the drill tip can, if so desired, be sharpened in order to produce nearly identical conditions during the first use cycle as during the following use cycles. The second coating then preferably extends over an area that, as measured from the drill tip, corresponds to at most double the nominal diameter of the drill.

Thanks to the inventive deep-hole drill, the second layer can be removed during re-sharpening and preferably in the same work process. It is possible to avoid having to remove the coating of the entire drill. After sharpening, the second layer only is applied again.

As previously mentioned, the requirement made of the first coating as regards anti-wear protection is much lower than for the second coating, whose effect occurs at the drill tip. As a first coating, it is thus possible to use a layer resp. a layer system that in addition to good wear properties also has the effect of stabilizing the drill back.

The invention will be described hereafter in detail on the basis of examples.

In example 1, a straight-fluted one-lip deep-hole drill is coated as a first coating with a 3 μm thick TiN layer. The drill has a nominal diameter of 6 mm. The TiN coating extends over an area of 5 cm, as measured from the drill tip. The TiN layer was applied by means of PVD. As a second coating, a TiAlN layer was applied by means of PVD and extends over an area of 8 mm from the drill tip.

After use, the drill coated in this manner is re-sharpened and the second layer is applied again on the currently layer-free main function by means of PVD. This cycle can be repeated as often as the tool's lifespan allows.

EXAMPLE 2

In example 2, a straight-fluted twin-lip deep-hole drill is coated as a first coating with a 4 μm thick TiAlN layer. The drill has a nominal diameter of 8 mm. The TiAlN coating extends over an area of 7 cm, as measured from the drill tip. The TiAlN layer was applied by means of PVD. As a second coating, a TiAlN layer was applied that extends over an area of 10 mm from the drill tip.

After use, the drill coated in this manner is re-sharpened and only the second layer is applied again on the currently layer-free main function by means of PVD. This cycle can be repeated as often as the tool's lifespan allows.

EXAMPLE 3

In example 3, a straight-fluted one-lip deep-hole drill is coated as a first coating with a 4 µm thick TiAlN layer. The drill has a nominal diameter of 8 mm. The TiAlN coating extends over an area of 7 cm, measured from the drill tip. The TiAlN layer was applied by means of PVD. As a second coating, a AlTiN layer was applied that extends over an area of 10 mm from the drill tip.

After use, the drill coated in this manner is re-sharpened and as second layer an AlCrN layer is applied on the currently layer-free main function by means of PVD. This cycle can be repeated with a varying second layer as often as the tool's lifespan allows.

What is claimed is:

1. Deep-hole drill having at least one essentially rectilinear flute with one or several cutting edges, a guide section that is at least partly coated, wherein the coated part defines a guide section, characterized in that the guide section comprises a first coating extending over the its effective length in relation to guiding the drill tip and, wherein additionally a second coating is applied only in an area at the tip of the drill in the cutting region which was not previously coated with the first coating or which was sharpened in order to produce nearly identical conditions during the first use cycle as during the following use cycles, the region of which extends over an axial length that, at most, corresponds to double the nominal diameter of the drill.

2. Deep-hole drill according to claim 1, characterized in that the first coating extends over a length that is at least perceptibly greater than the nominal diameter.

3. Deep-hole drill according to claim 1, characterized in that the first coating comprises a layer based on Ti and/or Al and/or Cr and/or Zr and/or carbon as well as combinations thereof as well as their nitrides and/or carbides and/or borides as well as oxides and in that the second coating comprises a layer based on Ti and/or Al and/or Cr and/or Zr and/or carbon and combinations thereof as well as their nitrides and/or carbides and/or borides as well as oxides.

4. Recycling method for a deep-hole drill, characterized by the steps of:
   (a) providing a deep-hole drill according to claim 1, which has symptoms of wear and tear on the drill tip;
   (b) removing the second coating;
   (c) in a step subsequent to step (b), coating the surface of the deep-hole drill from which coating was removed in step (b) with a further coating.

5. Deep-hole drill according to claim 2, wherein the first coating extends over at least eight times the nominal diameter of the drill.

6. Recycling method according to claim 4, wherein, in (b), the second coating is completely removed.

7. Recycling method according to claim 6, wherein the second coating is removed by means of re-sharpening.

8. Recycling method according to claim 4, wherein, in (c), the further coating comprises same as the original second coating.

9. A method for processing a deep-hole drill having at least one essentially rectilinear flute with one or several cutting edges, a guide section that is at least partly coated, wherein the coated part defines a guide section, comprises the steps of:
   (a) applying a first coating to the deep-hole drill over a predetermined length in relation to guiding the drill tip;
   (b) applying a second coating to a drill tip area, wherein the drill tip area was not previously coated with the first coating or was sharpened in order to produce early identical conditions during the first use cycle as during the following use cycles;
   (c) removing the second coating by means of re-sharpening; and
   (d) applying a third coating to the area where the second coating is removed, wherein the third coating comprises the second coating.

10. Deep-hole drill comprising a drill tip and a guide section that is at least coated in part, wherein the guide section comprises a first coating extending over an effective length of the guide section and a second coating applied to the drill tip in a cutting region,
   wherein the drill tip is coated only by the second coating or is sharpened in order to produce nearly identical conditions during the first use cycle as during the following use cycles; and
   wherein the cutting region extends over an axial length that, at most, corresponds to double the nominal diameter of the drill.

* * * * *